United States Patent [19]
Purcell et al.
[11] Patent Number: 5,047,192
[45] Date of Patent: Sep. 10, 1991

[54] PROCESS OF MANUFACTURING A CRYOGENIC REGENERATOR

[75] Inventors: John R. Purcell; Raymond E. Sarwinski, both of San Diego, Calif.
[73] Assignee: CDC Partners, San Diego, Calif.

[21] Appl. No.: 377,314
[22] Filed: Jul. 10, 1989

Related U.S. Application Data

[62] Division of Ser. No. 258,504, Oct. 17, 1988, Pat. No. 4,866,943.

[51] Int. Cl.$^5$ ...................... B29C 41/12; B29C 41/42; B29C 41/48
[52] U.S. Cl. .................................... 264/139; 264/159; 264/163; 264/294; 264/300; 264/304; 264/310; 425/296; 425/392; 425/402; 425/403; 425/404
[58] Field of Search ............... 264/134, 139, 163, 157, 264/159, 294, 295, 300, 304, 334, 339, 342, 316, 311, 310; 425/391, 392, 393, 296, 297, 402, 403, 404, 436; 62/6

[56] References Cited

U.S. PATENT DOCUMENTS

| | | | |
|---|---|---|---|
| 3,379,805 | 4/1968 | Roberts | 264/295 |
| 3,426,115 | 2/1969 | Taber | 264/339 |
| 3,997,645 | 12/1976 | Dempster | 264/163 |
| 4,268,471 | 5/1981 | Breher | 264/334 |
| 4,426,340 | 1/1984 | Coller et al. | 264/295 |
| 4,619,112 | 10/1986 | Colgate | 62/6 |
| 4,650,623 | 3/1987 | Berger | 264/163 |

*Primary Examiner*—Jay H. Woo
*Assistant Examiner*—Khanh P. Nguyen
*Attorney, Agent, or Firm*—R. Gale Rhodes, Jr.

[57] ABSTRACT

Process of manufacturing a cryogenic regenerator including a plurality of channels for conducting a working fluid, including the steps of providing a cylindrical forming member having a longitudinal axis and a plurality of peripheral slots displaced axially and oriented substantially parallel to the longitudinal axis of the cylindrical forming member, or having a continuous spiral peripheral slot of sufficiently small pitch such that the convolutions thereof are oriented substantially parallel to such longitudinal axis; providing epoxy which is relatively flexible upon hardening, loading the epoxy with thermally conductive material for enhancing the radial thermal conductivity of the cryogenic regenerator, and applying the epoxy to the periphery of the cylindrical forming member to fill the plurality of slots or the spiral peripheral slot with the epoxy and to form a radial layer of the epoxy of a generally first radial thickness allowing the epoxy to harden and thereafter reducing the radial thickness of the peripheral layer of hardened epoxy to a second smaller radial thickness; splitting the hardened relatively flexible epoxy radially and parallel to the axis and thereafter removing the epoxy from the cylindrical forming member to provide a relatively flexible base layer from the epoxy formerly residing on the periphery of the cylindrical forming member and to provide a plurality of substantially parallel corrugations from epoxy formerly residing in the plurality of slots or the spiral peripheral slot, the corrugations extending outwardly from a bottom of the base layer; and rolling the relatively flexible base layer into a generally cylindrical spiral having an axis with the corrugations extending parallel to the axis of the cylindrical spiral and with the corrugations extending radially inwardly and engaging a top of the base layer to cause the base layer and the corrugations to cooperatively form the plurality of channels.

4 Claims, 3 Drawing Sheets

PROCESS OF MANUFACTURING A CRYOGENIC REGENERATOR

This is a divisional of application Ser. No. 258,504, filed Oct. 17, 1988, now U.S. Pat. No. 4,866,943.

BACKGROUND OF THE INVENTION

This invention relates generally to a new and improved cryogenic regenerator (sometimes referred to merely as a regenerator), and more particularly is an improvement of the multiple channel regenerator section formed with rolled, corrugated and smooth foils enclosed within tubular walls as disclosed in FIG. 10 of U.S. Pat. No. 4,619,112, issued Oct. 28, 1986 to S. A. Colgate and assigned to Colgate Thermodynamics Company and entitled Stirling Cycle Machine. In addition, this invention relates to a new and improved process of manufacturing the cryogenic regenerator of the present invention.

As known to those skilled in the art, a cryogenic regenerator typically interconnects two compression-expansion chambers and conducts a working fluid (e.g. a gas such as helium) between the chambers. As is further known to those skilled in the art, upon the regenerator being interconnected between the chambers, one end may be at, for example, 300° K., and the other end may be at, for example, 70° K.; thus, a regenerator may be said to have hot and cold ends or relatively hot and relatively cold ends.

As is still further known to those skilled in the art, a major source of thermodynamic efficiency in the Stirling Cycle Machine and in other similar regenerative cryocoolers is the regenerator. This is especially true under high frequency; the stationary regenerator must exchange heat with the working fluid as the fluid passes back and forth through the regenerator at some frequency. To accomplish this in an efficient manner, a number of competing parameters must be dealt with.

An effective cryogenic regenerator must have sufficient heat capacity relative to the total enthalpy change of the working fluid. The regenerator must have a large surface are in contact with the working fluid so that only a small temperature difference exists between the cryogenic regenerator and the working fluid. Thermal conduction between the hot and cold ends of the cryogenic regenerator should be small compared to refrigeration (heating). The pressure drop across the regenerator should be small enough to keep viscous losses small. The void (dead volume in the regenerator) fraction should be small for high regenerator effectiveness and good heat transfer must be present between the working fluid and the regenerator (i.e. the material of which the regenerator is constructed) for high regenerator effectiveness.

The cryogenic regenerator must, therefore, make use of the proper geometry and materials of which it is constructed. While the geometry of the cryogenic regenerator is controlled by the designer, the optimum material for all temperature ranges may not exist, that is a single material may not be optimum for all such temperature ranges. An effective regenerator would optimize the paramaters noted above and should, desirably, be easy and inexpensive to construct. As is still further known to those skilled in the art, most commercially available materials suitable for cryogenic regenerator construction fail to meet one or more of these requirements.

Further, the typical cryogenic regenerator, e.g. the regenerator disclosed in the Stirling patent noted above, must effectively relate five variables. This poses a difficult design problem since many of the variables are conflicting. These variables are:

1. Non-ideal heat exchange between the working fluid (e.g. helium or nitrogen, etc.) and the regenerator material.
2. Extra work and frictional heat due to viscosity which causes pressure drop in the regenerator.
3. Loss because of dead volume of gas within the regenerator that does not expand or contract during the cycle, thus limiting the cycle compression ratio.
4. The departure from isothermality, because of the mass of the regenerator material. 5. Thermal conduction in the direction of primary heat flow, i.e., the axial or longitudinal direction of the regenerator.

Optimization of these five variables leads to a channel cryogenic regenerator with the working fluid moving with laminar flow through the channels. Variables 1 through 3 above deal mainly with the geometry of the regenerator, while variables 4 and 5 are primarily concerned with the materials used to construct the regenerator. If the regenerator is to span a large temperature range, the prior art (e.g. above-noted Stirling patent) teaches that the regenerator may be divided into sections--each individual section must be optimized with respect to heat capacity and longitudinal and axial thermal conductivity (material specific) and channel flow area, area of working fluid, e.g. gas, contact and length (geometry specific). For each section comprising such multi-section cryogenic regenerator, both geometry and material must change as the section operating temperature changes. The material of which each cryogenic regenerator section is constructed must have a high heat capacity so that its temperature change is small during the passage or conducting of the working fluid therethrough. Further, it has been discovered that the amount of material for the cryogenic regenerator section and its configuration must be consistent with low thermal conduction in the direction of fluid flow. It has been generally found that even alloys such as stainless steel will have too much conduction in the direction of flow while insulators such as plastics must be too thin in order to allow thermal penetration. It has been found that the manufacture of such prior art multi-channel cryogenic regenerator is difficult and expensive; particularly, the prior art spirally rolled cryogenic regenerator shown in FIG. 10 of the above-noted Colgate patent is manufactured, as illustrated in FIG. 11 thereof, from a plurality of individual members, i.e. foils 1005 and 1006, with foil 1005 being corrugated, and with the foils in turn supported by a tubular wall 1004. Accordingly, there exists a need in the art for a cryogenic regenerator which is easy and inexpensive to manufacture and which preferably is manufactured, not from a plurality of individual members which must be assembled, but instead which is integrally formed or formed from a single material, a single composite material.

As is known to those skilled in the art, the working fluid, e.g. gas, increases in density as it is conducted through the regenerator channels from the hot end to the cold end of the regenerator, and, as is still further known, the depth or transverse cross-sectional area of the prior art regenerator channels is constant along the length of the regenerator. Thus, there exists an undesirable mismatch between the increasing density of the working fluid as it is conducted through the regenerator channels from the hot end to the cold end of the regenerator and the depth or transverse cross-sectional area of the prior art regenerator channels. This mismatch undesirably increases the gas volume present in the regenerator and undesirably increases the pressure drop across the regenerator. Accordingly, there exists a need in the art for a better match betwee: the density of the working fluid and the depth or transverse cross-sectional area of the regenerator channels. It has been discovered, and in accordance with the teachings of the present invention, that by continuously decreasing the depth or continuously decreasing the transverse cross-sectional area of the channels from the hot end to the cold end of the regenerator a better match is provided between the working fluid and the depth or transverse cross-sectional area of the channels whereby both the volume of working fluid present in the regenerator and the pressure drop across the regenerator are both desirably decreased.

As noted above, further, good heat transfer must be present between the regenerator, i.e. the material of which the regenerator is constructed, and the working fluid being conducted therethrough for high generator effectiveness. It has been discovered, and in accordance with the further teachings of the present invention, that by continuously increasing the radial thermal conductivity of the material of which the regenerator is made from the hot end to the cold end increased heat transfer is desirably provided between the regenerator and the working fluid; of course, such continuous increase in axial thermal conductivity undesirably increases the axial or longitudinal thermal heat leak of the regenerator from the hot end to the cold end but it has been discovered that this is an acceptable compromise which is more than offset by the increased heat transfer.

Accordingly, it has been found that there exists a need in the art for new and improved multiple channel cryogencc regenerator which optimizes the above-noted five variables (preferably varying the optimization of these variables continuously over the length of the regenerator thereby avoiding the need for multi-sections) and which is easy and inexpensive to manufacture; it has been found that there exists a corollary need with and for a new and improved process of manufacturing such cryogenic regenerator.

SUMMARY OF THE INVENTION

It is the object of the present invention to satisfy the above-noted needs in the cryogenic regenerator art and to optimize treatment of the above-noted regenerator design variables.

A cryogenic regenerator satisfying the foregoing object and embodying the present invention may be formed by a spirally rolled, flexible composite material including a base layer having a top and a bottom provided with a plurality of spaced, substantially parallel corrugations extending outwardly therefrom and wherein the flexible base layer is rolled into a generally cylindrical spiral with the corrugations extending radially inwardly and engaging the top of the base layer to cause the base layer and the corrugations to cooperatively form a plurality of channels for conducting the working fluid through the regenerator. The relatively flexible composite material may be a relatively flexible, hardened epoxy; the composite material may be loaded with thermally conductive material and such loaded composite material may be an epoxy loaded with thermally conductive material. The depth or transverse cross-sectional area of the regenerator channels may continuously decrease from the hot end to the cold end of the regenerator to reduce the working fluid volume in the regenerator and to decrese the pressure drop across the regenerator by providing an improved match between the density of the working fluid and the depth or transverse cross-sectional area of the regenerator channels from the hot end towards the cold end. The percent volume of the thermally conductive material and the composite material or epoxy may be continuously increased from the hot end to the cold end to continuously increase the radial thermal conductivity of the regenerator, or regenerator material, from the hot end towards the cold end of the regenerator thereby enhancing heat transfer between the working fluid and the regenerator material as it is conducted through the regenerator from the hot end towards the cold end.

Process of manufacturing such cryogenic regenerator in accordance with the teachings of the present invention may include the steps of providing a cylindrical forming member having a plurality of peripheral slots displaced axially and oriented substantially perpendicular to the axis of the cylindrical forming member, or having a continuous spiral peripheral slot of such small pitch that the convolutions are oriented substantially parallel to the cylindrical forming member axis, applying a composite material such as an epoxy which is relatively flexible upon hardening to the periphery of the cylindrical forming member to fill the plurality of slots or spiral slot with the epoxy and to form a radial layer of epoxy of a general first radial thickness and, allowing the epoxy to harden and thereafter reducing the radial thickness of the peripheral layer of hardened epoxy to a second smaller radial thickness, splitting the hardened, relatively flexible epoxy radially and parallel to the axis of the cylindrical forming member and thereafter removing the epoxy from the forming member to provide a relatively flexible base layer from epoxy formerly residing on the periphery of the cylindrical forming member and to provide a plurality of substantially parallel corrugations from epoxy formerly residing in the plurality of slots or the spiral slot, such corrugations extending outwardly from the bottom of the base layer, and rolling the relatively flexible base layer, jelly-roll fashion, into a generally cylidrical spiral with the corrugations extending parallel to the axis of the cylindrical spiral and with the corrugations extending radially inwardly and engaging the top of the base layer to cause the base layer and the corrugations to cooperatively form the plurality of channels. The circumference or periphery of the cylindrical forming member may be made twice the length of the cryogenic regenerator to be formed and hence, in accordance with the further teachings of the present invention, two cryogenic regenerators may be formed simultaneously. Still further in accordance with the teachings of the present invention, the depth of the slots or spiral slot may increase continuously in each of two opposed peripheral directions to cause the epoxy residing in the slots to continuously increase in height from two diametrically opposed radial planes extending longitudinally along the periphery of, and parallel to the axis of, the cylindrical forming member, and upon the epoxy being removed such corrugations in cooperation with the base layer of epoxy will provide channels which continuously decrease in depth, or transverse cross-sectional area from one end (hot end) to the other end (cold end) of the regenerator. Still further, in accordance with the teachings of the present invention the epoxy may be provided with thermally conductive material to increase the heat capacity of the regenerator and still further, the percent volume of the thermally conductive material may be increased along the periphery of the cylindrical forming member and, in the embodiment where two regenerators are formed simultaneously, may be decreased continuously in both peripheral directions from the minimum to the maximum depth of the slots whereby upon the regenerators being formed (spirally rolled jelly-roll fashion) the percent volume of the thermally conductive material will increase from one end (the hot end) to the other end (the cold end) of the regenerator to thereby enhance the heat transfer between the regenerator, or regenerator material, and the working fluid flowing therethrough from the hot end to the cold end.

DETAILED DESCRIPTION OF THE INVENTION

Figure 9:
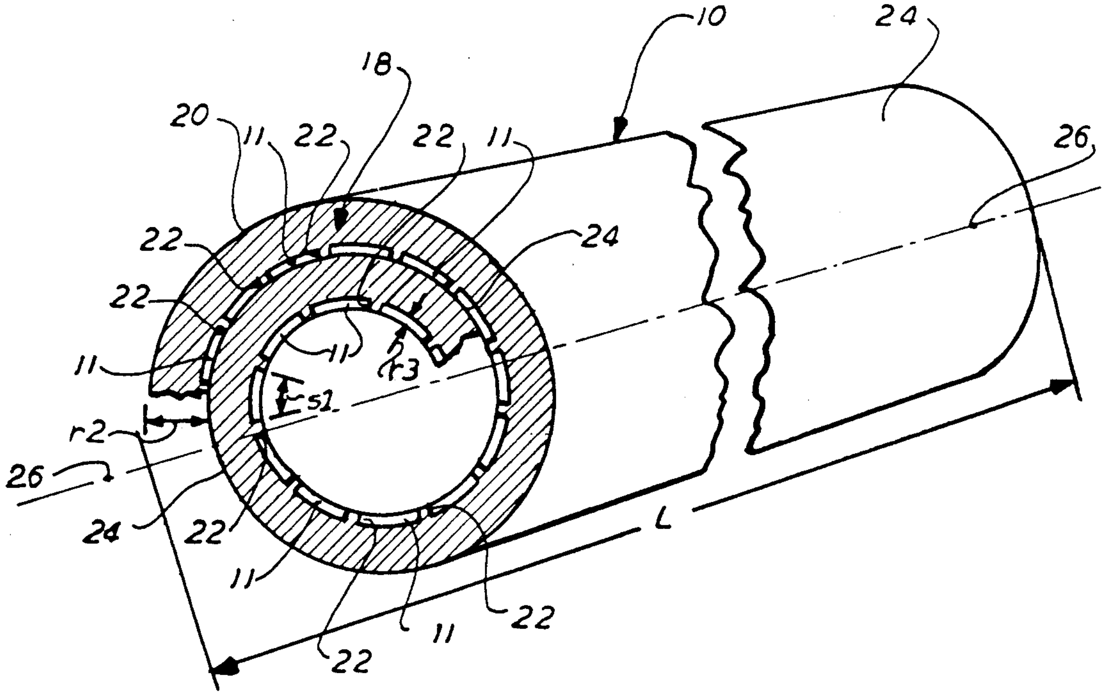
FIG. 9 is a perspective view of a cryogenic regenerator embodying the present invention.

Referring now to FIGS. 1-6, there is illustrated a process embodiment of the present invention for manufacturing a spirally rolled cryogenic regenerator embodying the present invention and which regenerator is illustrated in FIG. 9 and identified by general numerical designation 10. Generally it will be understood that the cryogenic regenerator 10 is provided with a plurality of longitudinally or axially extending channels 11 and is for being interconnected between first and second compression-expansion chambers of cryogenic apparatus with the channels 11 conducting working fluid between the chambers.

Figure 1:
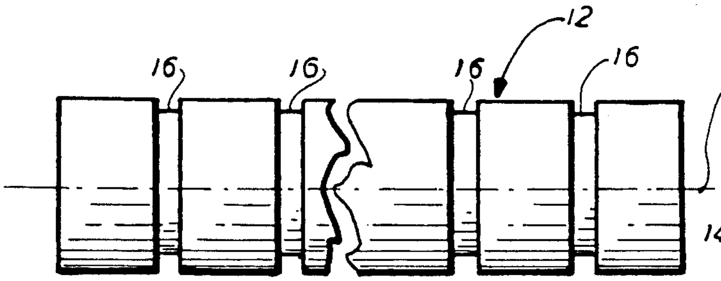
FIG. 1 is a side view of a cylindrical forming member useful for practicing the process of the present invention to produce the cryogenic regenerator of the present invention.
Figure 2:
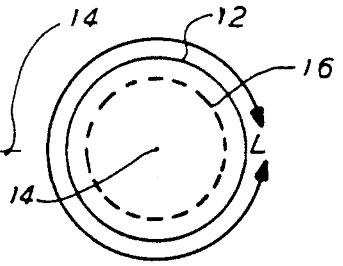
FIG. 2 is an end view of the cylindrical forming member of FIG. 1.

With further regard to such process, shown in FIG. 1 is a cylindrical forming member 12 having an axis 14 and being provided with a plurality of peripheral slots 16 displaced axially and oriented substantially parallel to the axis 14. As shown in FIG. 2, the circumferential or peripheral length of the cylindrical forming member 12 is L which is also the length, or axial length, L of the cryogenic regenerator 10 of FIG. 9.

Figure 4:
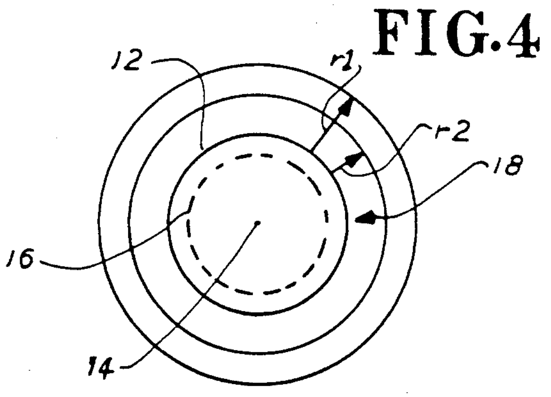
FIGS. 4, 5 and 6 are sequential diagrammatical end views illustrating the manufacturing process of the present invention.

To form the cryogenic regenerator 10, and as illustrated in FIG. 4, a suitable epoxy, indicated by general numerical designation 18, and which epoxy is relatively flexible upon hardening, is applied to the periphery of the cylindrical forming member 12 to fill the plurality of slots 16 with the epoxy and to form a radial layer of epoxy surrounding the periphery of the cylindrical forming member 12 and of a generally first radial thickness r1. The epoxy 18 is allowed to harden and thereafter the radial thickness of the hardened epoxy surrounding the periphery of the cylindrical forming member 12 is reduced, such as by machining, to provide the epoxy with a second smaller radius r2.

Figure 5:
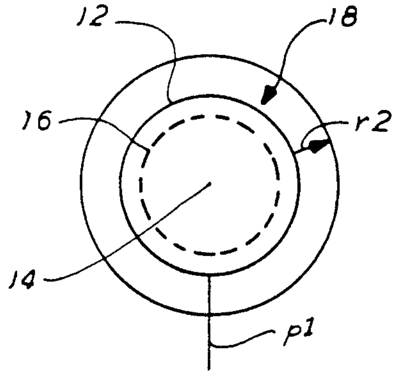
Figure 6:
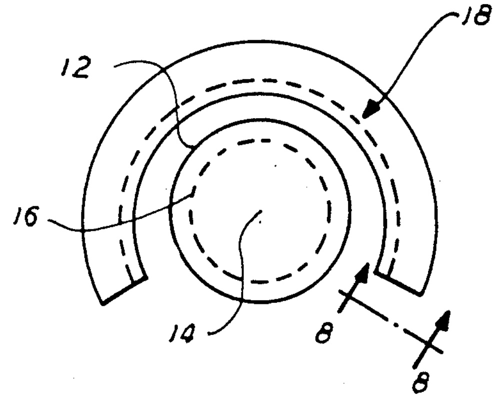

Subsequently, as shown in FIG. 5, the hardened epoxy 18 is split radially and. parallel to the axis 14 of the cylindrical forming member, e.g. along the radial plane pl of FIG. 5, and, as illustrated in FIG. 6, the epoxy 18 is removed from the cylindrical forming member 12 to provide, as may be best seen in FIG. 8, a relatively flexible base layer 20 from epoxy formerly residing on the periphery of the cylindrical forming member 12 and to provide a plurality of substantially parallel corrugations 22 from epoxy formerly residing in the plurality of slots 16; the base layer 20 has a top 24 and a bottom 25 and the corrugations 22 extend outwardly from the bottom 25 of the base layer 20. Thereafter, as may be understood by reference to FIG. 9, the base layer 20 of relatively flexible epoxy 18 is rolled, jelly-roll fashion, into a generally cylindrical spiral as shown in FIG. 9 with the corrugations 22 extending parallel, or at least substantially parallel, to the axis 26 of the cylindrical spiral and with the corrugations 22 extending radially inwardly and engaging the top 24 of the base layer 20 to cause the base layer 20 and the corrugations 22 to cooperatively form the plurality of longitudinally or axially extending channels 11.

Further, prior to the application of the epoxy 18 to the cylindrical forming member 12, the periphery of the cylindrical forming member and the slots 16 (FIG. 1) may be coated with a suitable release agent to enhance removal of the epoxy from the cylindrical forming member, and the cylindrical forming member may be rotated during the hardening or curing of the epoxy to enhance uniformity of hardening or curing.

Figure 8:
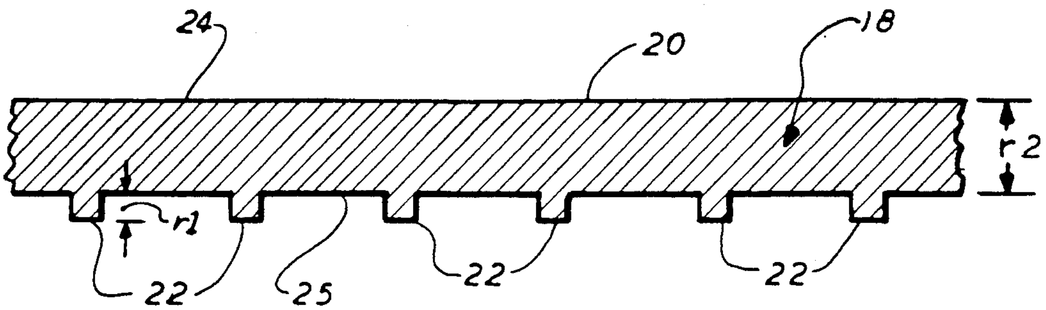
FIG. 8 is a partial end view, taken generally along the line 8—8 in FIG. 6 in the direction of the arrows, of an intermediate stage of material useful for practicing the process of the present invention to produce the cryogenic regenerator of the present invention.

Still further, it will be understood that the radial thickness r2 of the machined epoxy 18, FIG. 4, is the width or thickness of the base layer 20, FIG. 8, and that height h1 of the corrugations 22, FIG. 8, determines the radial width r3, FIG. 9, of the channels 11. Yet further, it will be understood that the spacing s1, FIG. 9, between the corrugations 22 is large as compared to the height of the corrugations to enhance channel efficiency. The height h1 of the corrugations is determined by the depth of the slots 16 (FIG. 1).

In accordance with the further teachings of the present invention, it will be understood that the epoxy 18 may be loaded or filled with thermally conductive material to enhance the radial thermal conductivity of the cryogenic regenerator 10 and thereby to enhance heat transfer between the cryogenic regenerator 10, or the epoxy material of which it is made, and the working fluid conducted through the channels 11. Such thermally conductive material may be, for example, suitable thermally conductive material such as flakes or powder of copper, lead and the like, which may be suitably mixed with the epoxy prior to application to the cylindrical forming member 12 of FIG. 1. It will still be further understood that the epoxy 18 may be comprised of a suitable resin and hardener each comprising approximately 50% by weight of the epoxy and that the thermally conductive material when included in the epoxy may comprise approximately 50% by volume of the epoxy.

Figure 3:
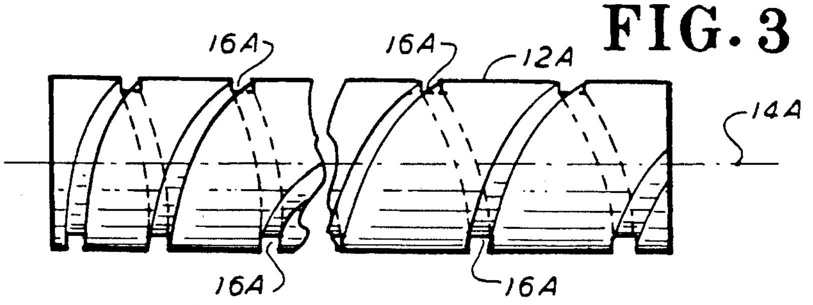
FIG. 3 is a side view of a cylindrical forming member alternate to that shown in FIG. 1.

Alternate to the plurality of slots 16 of FIG. 1, it will be understood that in accordance with the further teachings of the present invention a cylindrical forming member 12A, FIG. 3, may be provided with a continuous spiral slot 16A of sufficiently small pitch such that the convolutions thereof are oriented substantially parallel to the axis 14A of the cylindrical forming member 12A. Thus, it will be understood that with such small pitch upon the epoxy 18 filling the continuous spiral slot 16A, hardening, being radially split and removed as taught above, the epoxy formerly residing in the continuous spiral slot 16A will provide a plurality of corrugations which, due to the small pitch of the spiral slot 16A, will be substantially parallel to the axis of the cryogenic regenerator upon the above-noted spiral rolling of the epoxy.

Figure 7:
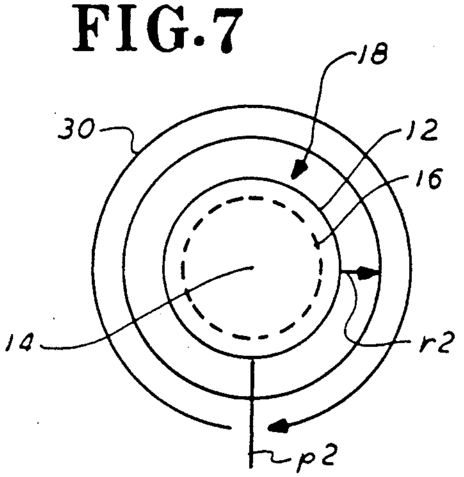
FIG. 7 is a diagrammatical end view of a process alternate to that shown in FIGS. 4, 5 and 6.

In a further embodiment of the present invention, as illustrated diagrammatically in FIG. 7, the above-noted thermally conductive material may be mixed with the epoxy 18 such that upon the cryogenic regenerator being interconnected between the above-noted first and second compression-expansion chambers, and having a relatively hot end and a relatively cold end as also noted above, the percent volume of the thermally conductive material in the epoxy will continuously increase in percent volume from the hot end to the cold end thereby enhancing heat transfer between the cryogenic regenerator (i.e. material thereof) and the working fluid conducted therethrough. In accordance with the further teachings of the process of the present invention, and as illustrated diagrammatically in FIG. 7 by the arrow 30, the percent volume of the thermally conductive material in the epoxy is mixed or loaded such that it increases continuously 360° from one side to the other side of the radial plane p2 extending longitudinally along the periphery of, and prpendicular to the axis of, the cylindrical forming member 12. Thus upon the so loaded epoxy spirally rolled as taught above, the thermally conductive material in the epoxy will continuously increase in percent volume from one end to the other end thereof thereby permitting the regenerator to be oriented between the expansion-compression chambers such that the percent volume of the thermally conductive material in the epoxy increases continuously from the hot end to the cold end of the regenerator and the noted enhanced heat transfer will be achieved.

Still further, it will be understood that in accordance with the still further teachings of the present invention a plurality of cryogenic regenerators 10 may be formed, substantially simultaneously, by making the circumferential or peripheral length of the cylindrical forming member, e.g. cylindrical forming members 12 and 12A of FIGS. 1 and 2, equal to a multiple of the length L of the cryogenic regenerator. Thereafter, the epoxy would be split along a plurality of radial planes dividing the individual regenerator lengths L and subsequently the plurality of spirally rolled cryogenic regenerators may be formed as taught above.

Figure 10:
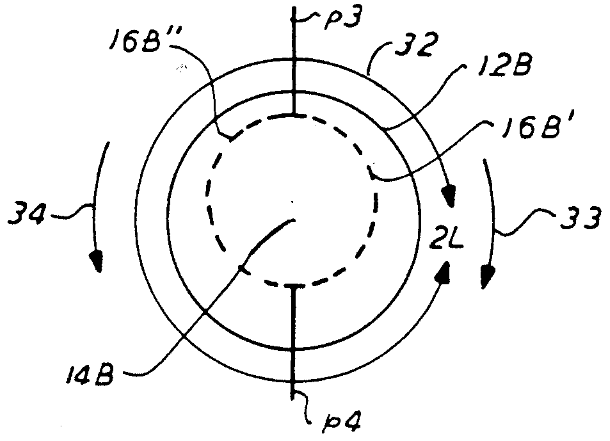
FIGS. 10, 11 and 13 are diagrammatical, sequential end views of an alternate manufacturing process of the present invention for simultaneously manufacturing two cryogenic regenerators embodying the present invention.
Figure 11:
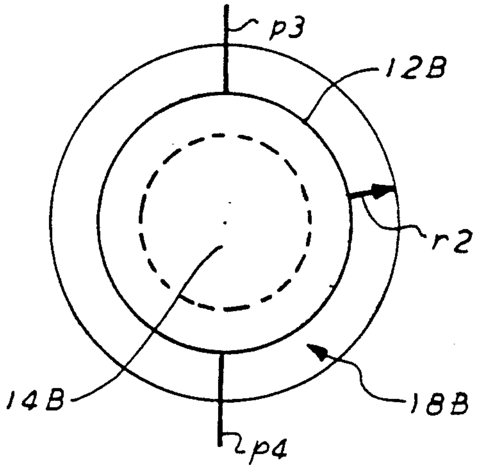
Figure 12:
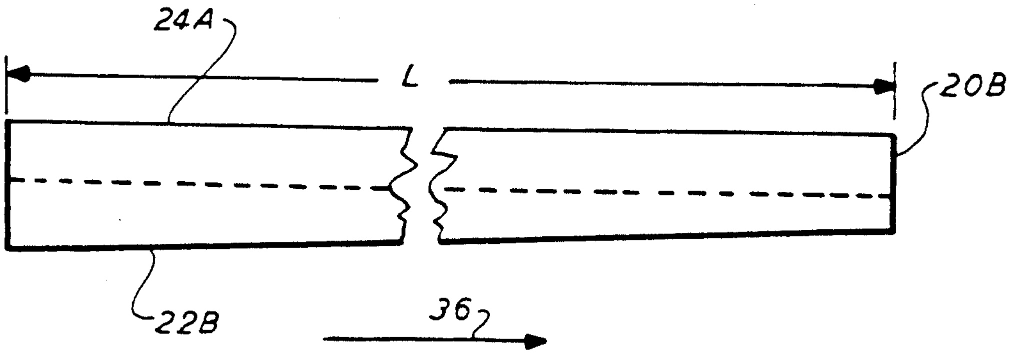
FIG. 12 is a diagrammatical end view of a manufacturing process alternate to that illustrated in FIGS. 10 and 11.

Referring now to FIGS. 10, 11 and 12, a still further process of the present invention is illustrated wherein two cryogenic regenerators are formed substantially simultaneously and the resulting cryogenic regenerators are provided with a plurality of channels which continuously decrease in depth, or transverse cross-sectional width, from one end to the other end of the resulting cryogenic regenerator; it will be understood that upon such cryogenic regenerator being interconnected between first and second compression-expansion chambers and having a relatively hot end and a relatively cold end, the cryogenic regenerator may be oriented such that the depth or transverse cross-sectional area of the channels continuously decrease from the hot end to the cold end of the regenerator thereby reducing the amount of working fluid (e.g. gas such as helium) present in the channels which results in a better match between the density of the working fluid as it increases while being conducted through the cryogenic regenerator from the relatively hot end to the relatively cold end, and this match desirably reduces the volume of working fluid present in the cryogenic regenerator and also desirably reduces the pressure drop across the cryogenic regenerator.

As shown in FIG. 10, the cylindrical forming member 12B is provided with a peripheral or circumferential length (indicated by arrow 32) equal to 2L, twice the length L of the cryogenic regenerators to be formed, and also is provided with slots 16B'and 16B'' which constantly increase in depth from a minimum to a maximum depth in each peripheral direction, indicated by the arrows 33 and 34, between diametrically opposed radial planes p3 and p4 extending longitudinally along the periphery of, and parallel to the axis 14B of the cylindrical forming member 12B. Thereafter, as generally taught above, epoxy 18B is applied to the peripnery of the cylindrical forming member 12B and to fill the slots 16B' and 16B'' whereafter, as illustrated in FIG. 11, the epoxy 18B is split radially and parallel to the axis 14B of the cylindrical forming member 12B along each of the diametrially opposed radial planes p3 and p4 to provide two relatively flexible base layers of epoxy, a representative one 20B being shown in partial side view in FIG. 12 and being provided with a plurality of corrugations 22B which continuously decrease in height (in direction of arrows 36, FIG. 12) since they are formed by epoxy formerly residing in one of the slots 16B', 16B'' of continuously increasing depth (in direction of arrows 33 and 34, FIG. 10) as taught above. Thus, upon the base layer 20B provided with corrugations 22B being rolled spirally as generally shown in FIG. 9 and as taught above, the corrugations 22B which constantly decrease in height in the direction of the arrow 36 shown in FIG. 12 will engage the top 24A of the base layer 24B and cooperatively therewith form a plurality of channels llB (not shown) which will also constantly decrease in depth, or in transverse cross-sectional area, in the direction of the arrow 36. Thus it will be understood that upon the cryogenic regenerator being formed by base layer 20B and corrugations 22B being interconnected between first and second compression-expansion chambers of the type noted above, the cryogenic regenerator may be so oriented such that rhe channels 11B (not shown) continuously decrease in depth, or continuously decrease in transverse cross-sectional area from the hot end to the cold end of the cryogenic regenerator. As the working fluid being conducted through the cryogenic regenerator from the hot end to the cold end continuously increases in density, an improved match will be provided between such working fluid and the depth or transverse cross-sectional area of channels 11B (not shown) through which the working fluid is being conducted. It will be further understood that the epoxy 18B may be loaded or filled with thermally conductive material as taught above with regard to epoxy 18.

Figure 13:
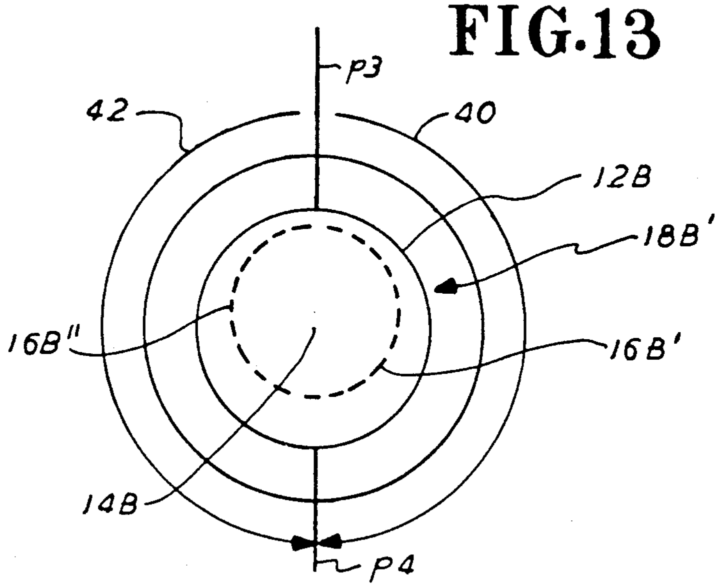

In accordance with the further teachings of the present invention a further improvement of the invention, illustrated in FIGS. 10–12 and described above, is illustrated diagrammatically in FIG. 13. Generally, it will be understood that the invention of FIG. 13 is the same as that illustrated in FIGS. 10–12 and taught above except that the epoxy is filled or loaded with thermally conductive material, as taught above, but in this embodiment the percent volume of the thermally conductive material loaded in epoxy 18B′ continuously decreases in percent volume in each of the peripheral directions indicated by the arrows 40 and 42 between the diametrically opposed radial planes p3 and p4 or as may be viewed oppositely, the percent volume of thermally conductive material loaded in the epoxy continuously increases in the direction opposite to the arrows 40 and 42. Thus, it will be understood that upon the epoxy 18B′ and 18B′ hardening, being split and removed as taught above with regard to FIGS. 10–12, and spirally rolled into a cryogenic regenerator as also taught above, the resulting spirally rolled cryogenic regenerator will not only be provided with channels 11B (not shown) which constantly decrease in depth or transverse cross-sectional area from one end to the other (i.e. from the hot end to the cold end of the regenerator when interconnected and oriented as taught above), but the percent volume of the thermally conductive material filled or loaded in the epoxy will continuously increase in the same direction that the depth or transverse cross-sectional area of the channels 11B (not shown) is decreasing whereby the radial thermal conductivity of the epoxy and cryogenic regenerator will continuously increase from the hot end to the cold end of the cryogenic regenerator thereby enhancing heat transfer between the regenerator and the working fluid being conducted therethrough particularly from the hot end to the cold end of the regenerator.

Referring again to the cylindrical forming members shown in FIGS. 1–3 and FIGS. 10, 11 and 13, it will be understood that the cylindrical forming members may be conveniently made from a suitable metal, such as aluminum or an aluminum alloy, by suitable machine. Further, with regard to the slots of varying depth illustrated in FIGS. 10, 11 and 13, whether such slots or a plurality of slots 16 as shown in FIG. 1 or a continuous spiral slot 16A as shown in FIG. 3, these slots of varying depth may be conveniently produced by chucking the cylindrical forming member off-center whereby upon the slots being produced they will be of varying depth as the cylindrical forming member is rotated off-center on the machine. The epoxy used may be any one of several commercially available epoxies which, upon hardening, is relatively flexible permitting the epoxy to practice the invention as disclosed and claimed herein.

It will be further understood, and in accordance with the further teachings of the present invention, that the radial thickness r2 of the layer 20 (FIG. 8) relative to the height h1 of the corrugations 22 may be varied and may be varied over the length of the cyrogenic regenerator. This may be done by varying the depth of the slots 16 (FIG. 1) and/or by varying the radial thickness r2.

It will be understood that many variations and modifications of the present invention may be made without departing from the spirit and the scope thereof.

What is claimed is:

1. Process of manufacturing a cryogenic regenerator including a plurality of channels for conducting a working fluid, comprising the steps of:

providing a cylindrical forming member having a longitudinal axis and a plurality of peripheral slots displaced axially and oriented substantially parallel to said longitudinal axis or having a continuous spiral peripheral slot of sufficiently small pitch such that the convolutions thereof are oriented substantially parallel to said longitudinal axis;

providing epoxy which is relatively flexible upon hardening, loading said epoxy with thermally conductive material for enhancing the radial thermal conductivity of said cryogenic regenerator, and applying said epoxy to the periphery of said cylindrical forming member to fill said plurality of slots or said spiral peripheral slot with said epoxy and to form a radial layer of said epoxy of a generally first radial thickness;

allowing said epoxy to harden and thereafter reducing the radial thickness of said peripheral layer of hardened epoxy to a second smaller radial thickness;

splitting said hardened relatively flexible epoxy radially and parallel to said axis and thereafter removing said epoxy from said cylindrical forming member to provide a relatively flexible base layer from said epoxy formerly residing on the periphery of said cylindrical forming member and to provide a plurality of substantially parallel corrugations from epoxy formerly residing in said plurality of slots or said spiral peripheral slot, said corrugations extending outwardly from a bottom of said base layer; and rolling said relatively flexible base layer into a generally cylindrical spiral having an axis with said corrugations extending parallel to said axis of said cylindrical spiral and with said corrugations extending radially inwardly and engaging a top of said base layer to cause said base layer and said corrugations to cooperatively form said plurality of channels.

2. Process according to claim 1 wherein said process includes the further step of continuously increasing the percent volume of said thermally conductive material in said epoxy 360° from one side to the other side of a radial plane extending longitudinally along the periphery of, and perpendicular to the axis of, said cylindrical forming member.

3. Process according to claim 1 wherein said process is for manufacturing two cryogenic regenerators each having an axial length L, wherein said step of providing said cylindrical forming member is the step of providing a cylindrical forming member with a circumference equal to 2L; and wherein said process includes the further step of forming said slots or slot with a depth which increases constantly from a minimum to a maximum depth in each peripheral direction between diametrically opposed radial planes extending longitudinally along the periphery of, and parallel to said axis of, said cylindrical forming member, wherein said process includes the further step of splitting said hardened relatively flexible epoxy radially and parallel to the axis of said cylindrical forming member along each of said diametrically opposed radial planes to provide two of said relatively flexible base layers of epoxy each having said plurality of corrugations extending outwardly from the bottom thereof; and wherein said process includes the further step of rolling each of said relatively flexible base layers into said generally cylindrical spiral and wherein said channels of each cryogenic regenerator decrease continuously in depth from one end to the other end of each cryogenic regenerator.

4. Process according to claim 3 wherein said process includes the further step of continuously decreasing the percent volume of said thermally conductive material loaded in said epoxy in each of said peripheral directions between said minimum and maximum depth of said slots or slot.

* * * * *